Jan. 24, 1961

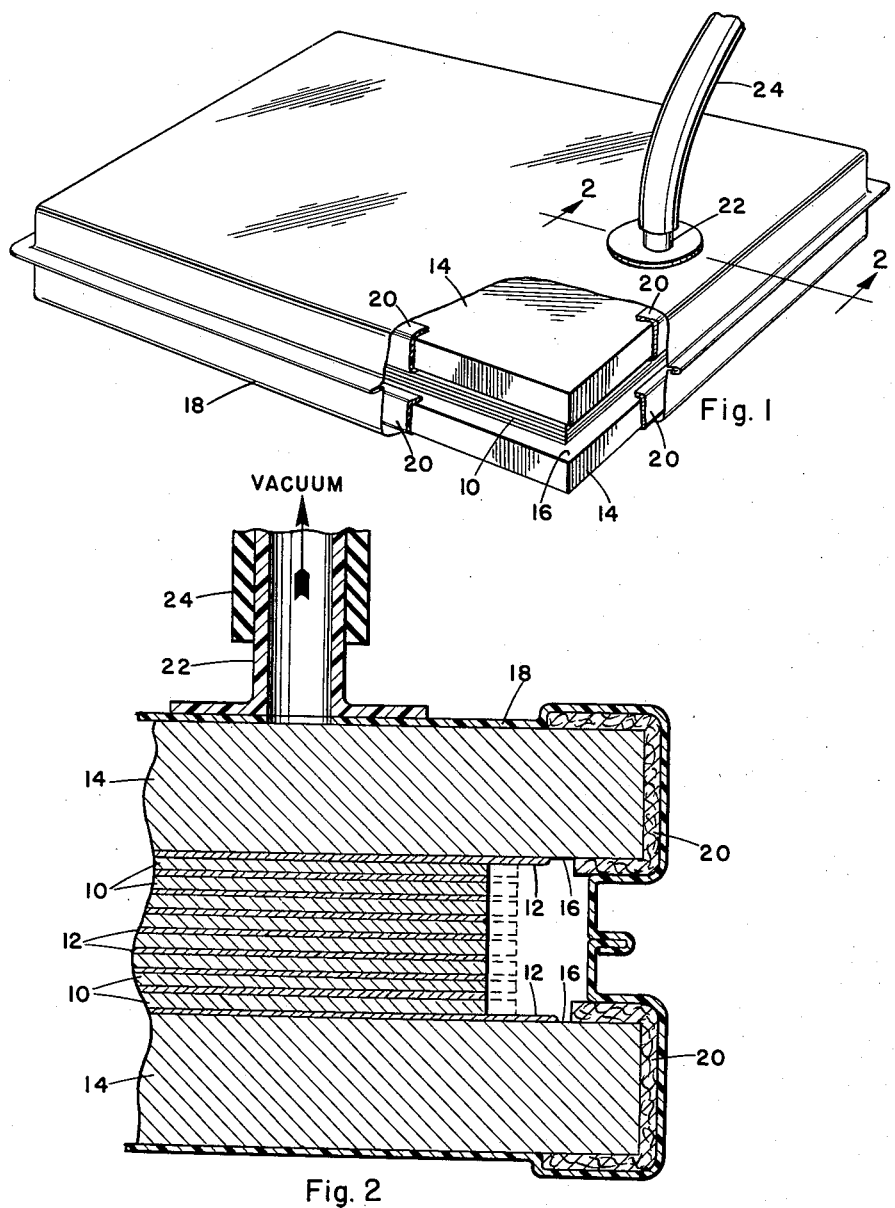

J. R. FULLERTON ET AL 2,969,299

METHOD OF HANDLING THIN-SHEET MATERIAL
TO PREVENT DISTORTION

Filed July 21, 1958

INVENTORS.
JOHN R. FULLERTON
LAWRENCE E. LEECH
DONALD L. HEYSER

By Knox & Knox

United States Patent Office 2,969,299
Patented Jan. 24, 1961

2,969,299

METHOD OF HANDLING THIN-SHEET MATERIAL TO PREVENT DISTORTION

John R. Fullerton and Lawrence E. Leech, San Diego, and Donald L. Heyser, Lemon Grove, Calif., assignors to Ryan Aeronautical Co., San Diego, Calif.

Filed July 21, 1958, Ser. No. 749,831

5 Claims. (Cl. 148—131)

The present invention relates generally to metal treatment and more particularly to a method of handling thin sheet material having inherent grain growth during treatment.

Certain types of stainless steels are processed from an annealed state to a hardened state by various treatments, one stage of which includes a transformation process during which the material is subject to a grain growth. For many reasons it is desirable to prevent distortion of the material during this grain growth.

This invention is applicable to a wide field of uses and can be employed to retain sheets of such material, either flat or preformed, against deformation during transformation, irrespective of the character of the final structure in which such sheets are embodied. To exemplify, one such field of use exists in the fabrication of metal foil structures. The welding temperature must be very accurately controlled so that the exact degree of fusion is accomplished at the weld points or seams without the formation of holes in the foil occasioned when localized welding temperature becomes too high and "burning" results. The problem of welding heat control is greatly reduced when the foil or thin sheets are perfectly flat. When these thin sheets are of precipitation hardening steel such as chromium-nickel steel they are commercially obtained in an annealed state and, in preparing such steels for welding, hardening must be accomplished by suitable treatment. One particularly effective treatment is to subject the material to a temperature of approximately $-100°$ F. for an extended period, which causes the material to transform from an annealed, austenitic structure to a martensitic structure. In the transformation process, however, a grain growth takes place causing an expansion on the order of .004 per linear inch, with resulting distortion of the material. When treating thin sheets of such material in this manner, the distortion causes buckling and the material is made unsuitable for accurate welded structures. The present invention enables thin sheets of precipitation hardening material to be transformed at low temperature without distortion and without damage to the surfaces, which must be kept smooth and clean.

The primary object of this invention, therefore, is to provide a method of handling precipitation hardening material during low temperature treatment in which thin sheets of the material are clamped between rigid, flat plates to prevent the thin sheets from buckling due to grain growth of the material.

Another object of this invention is to provide a method of the aforementioned character in which the rigid plates and thin sheets are lubricated to allow linear expansion of the thin sheets while under flattening pressure.

A further object of this invention is to provide a method of the aforementioned character in which preformed sections of material are clamped between shaped blocks to preserve the exact shape of the material during treatment.

Finally, it is an object to provide a material handling method of the aforementioned character which is simple and convenient to carry out and which will protect the material being treated and maintain surface accuracy in the individual sheets of material.

With these and other objects definitely in view, this invention consists in the novel use and arrangement of elements and the operations involved therewith, as will be hereinafter fully described in the specification, particularly pointed out in the claims, and illustrated in the drawings which form a material part of this disclosure, and in which:

Figure 1 is a perspective view of the assembly of rigid plates and thin sheets enclosed in a flexible bag, the bag being partially cut away;

Figure 2 is an enlarged fragmentary sectional view taken on the line 2—2 of Figure 1;

Figure 3:
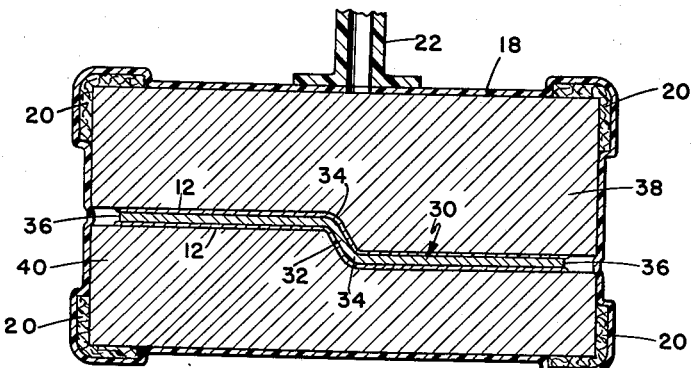
Figure 3 is a transverse sectional view showing a formed member of material held between shaped blocks and enclosed in a flexible bag.
Figure 4:
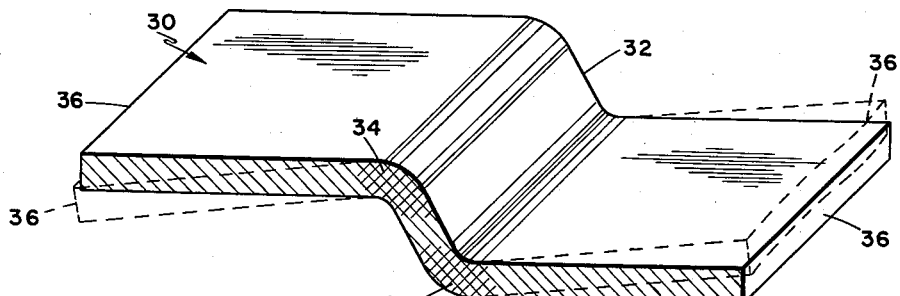
Figure 5:
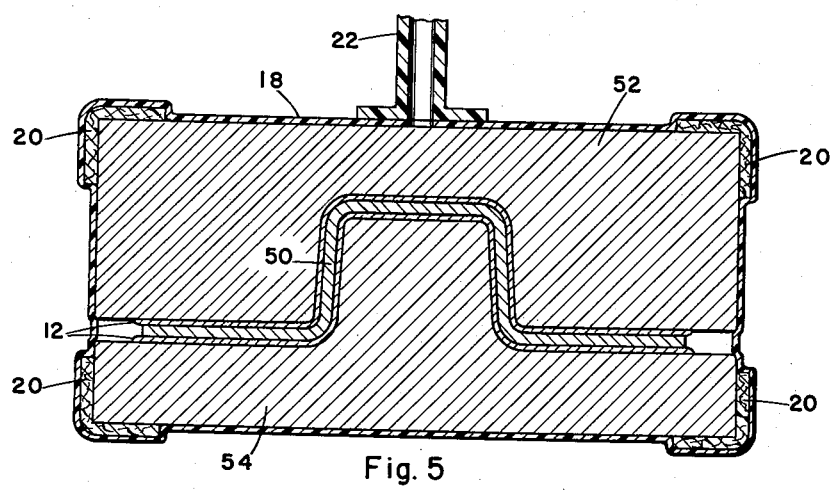

Figure 4 is an enlarged sectional perspective view of the member shown in Figure 3 indicating localized partial transformation in those portions which have been bent or otherwise worked and indicating the increased tendency toward buckling in such preformed material; and Figure 5 is a sectional view similar to Figure 3, showing a more complex form to illustrate further the versatility of the method.

Similar characters of reference indicate similar or identical elements and portions throughout the specification and throughout the views of the drawings.

The method of treatment herein disclosed was primarily discovered and developed in connection with the preparation of sheets of special alloy steel, the sheets being of thicknesses from .002 to .010 inch for use in very light weight structures such as employed in aircraft. It should be clearly understood, however, that the method is applicable to other types and sizes of materials which have an inherent dimensional change due to molecular structure changes, usually referred to as grain growth or expansion, during treatment and which require control to prevent distortion.

By way of an example, as material such as chromium-nickel stainless steel, containing 17% chromium and 7% nickel as alloy elements, is commercially prepared in thin sheets in an annealed, austenitic state. The sheets, each indicated by the numeral 10, are coated on both faces by a suitable lubricant which retains its properties over a wide range of temperatures and pressures. The lubricated sheets 10 are stacked and placed between two thick blocks or plates 14 having accurately machined confronting faces 16, which are also coated with lubricant 12, the plates and sheets of material forming a composite sandwich, as illustrated in the drawing. The plates 14 are substantially larger in length and width than the sheets 10 and are thick enough to prevent bending and distortion, said plates being of aluminum or the like for ease of handling.

The composite sandwich is placed in a flexible bag 18 of plastic or similar non-porous material, all corners and edges of the plates 14 being covered by pads 20 to prevent damage to the bag. The pads 20 may be of fiber, paper, tape, or any other suitable protective material. The bag 18 is provided with an outlet 22 which is connected to a source of vacuum such as a pump, by means of a hose 24. Thus when the bag 18 is sealed in a suitable manner, the air may be evacuated causing the bag to collapse tightly around the contours of the plates 14, the external atmospheric pressure clamping said plates together and holding the sheets 10 in the form dictated by the confronting faces 16, this form being ostensibly flat throughout the complete area thereof, although contoured plates could be employed, if the use thereof in a particular instance was justified.

In the process of treatment, the bag 18 and its contents are placed in a low temperature chamber and the temperature is reduced to −100° F. As the temperature is reduced, the bag 18 is evacuated and the vacuum is maintained constantly while the sheets 10 are soaked at the low temperature, normally for several hours. This low temperature soaking causes the material in the sheets 10 to undergo a transformation from an austenitic to a martensitic structure. During this transformation the material has an inherent grain growth of approximately .004 per linear inch and is subject to powerful expansion forces. Since the plates 14 are clamping the sheets 10 tightly together, no buckling can take place and all expansion must be linear and substantially coplanar, the liberal use of lubricant 12 allowing the sheets to expand as necessary with a minimum of friction, as indicated in dash line in Figure 2. When the transformation is completed, the sheets 10 are brought up to normal temperature and the vacuum is released. It has been found that the resultant hardened sheets of thin material are free of distortion and maintain a high surface finish.

The process is also applicable to formed members such as the joggled member 30 illustrated in Figure 4, the joggle 32 running longitudinally substantially at the center of the member. When the joggle 32 is formed with the material in annealed condition, the material in the bend areas 34, indicated by cross shading, is work hardened and partially transformed. Thus in the low temperature treatment, the bend areas 34 are not subject to the same amount of grain growth as the unworked portions of the member, with the result that the edge portions 36 bend, stretch and become buckled, as indicated in dash line. In order to hold the joggled member 30 and prevent such distortion, form blocks 38 and 40 are placed on either side of the member, which has been coated with lubricant 12. The form blocks 38 and 40 are shaped to conform closely to the shape of the member 30, and in the event that said member is pressed to shape the actual forming blocks may be used. The assembly is enclosed in a flexible bag 18 using pads 20 at the corners as necessary, and the air is evacuated through the outlet 22. In this manner the member 30 may be subjected to the low temperature treatment without becoming distorted.

Many different formed members may be handled by this method as further exemplified in Figure 5, which illustrates a member 50 of well known top hat section clamped between shaped form blocks 52 and 54 and enclosed in a bag 18 as previously described. The high degree of surface and contour control afforded by this process is of great advantage in the manufacture of accurate structural components such as used in aircraft. Many structural components must undergo complex forming operations while the material is still in a workable state and, without the above described handling, the transformation treatment would cause distortion to a degree which would render the parts unusable.

It is understood that minor variation from the form of the invention disclosed herein may be made without departure from the spirit and scope of the invention, and that the specification and drawings are to be considered as merely illustrative rather than limiting.

We claim:

1. A method of handling thin material having inherent grain growth changes during low temperature heat treatment to prevent distortion of the material, comprising: placing the material between two rigid, plate elements having confronting surfaces shaped to conform to the corresponding surfaces of the material; enclosing the resultant sandwich of material and thick plates in a sealed, flexible, non-porous bag; evacuating the air from the interior of the bag causing said material to be clamped flat between said thick plates by external pressure and preventing contamination and surface finish damage to the material; and maintaining the vacuum while the temperature is lowered for the period of time required for treatment.

2. A method of handling thin sheet material having inherent grain growth changes during low temperature heat treatment to prevent distortion of the material, comprising: stacking a plurality of thin sheets of the material between confronting flat surfaces of two thick, rigid plates; enclosing the resultant sandwich of thin sheets and thick plates in a sealed, flexible, non-porous bag; evacuating the air from the interior of the bag causing said thin sheets to be clamped flat between said thick plates by external pressure and preventing contamination and surface finish damage to the material; and maintaining the vacuum while the temperature is lowered for the period of time required for treatment.

3. A method of handling thin sheet material having inherent grain growth changes during low temperature heat treatment to prevent distortion of the material, comprising: lubricating the surfaces of several thin sheets of the material; stacking the sheets between two thick, rigid plates having flat opposed surfaces; enclosing the resultant sandwich of thin sheets and thick plates in a sealed, flexible, non-porous bag; evacuating the air from the interior of the bag causing said thin sheets to be clamped flat between said thick plates by external pressure and preventing contamination and surface finish damage to the material; and maintaining the vacuum while the temperature is lowered for the period of time required for treatment.

4. A method of handling thin sheets of precipitation hardening stainless steel having inherent grain structure changes during low temperature heat treatment to prevent distortion of the material, comprising: lubricating the surfaces of several thin sheets of the material; stacking the sheets between two thick, rigid plates having flat opposed surfaces; enclosing the resultant sandwich of thin sheets and thick plates in a sealed, flexible, non-porous bag; evacuating the air from the interior of the bag causing said thin sheets to be clamped flat between said thick plates by external pressure and preventing contamination and surface finish damage to the material; reducing the temperature of the material to approximately −100° F.; and maintaining the vacuum and low temperature until the thin sheets are changed from an austenitic to a martensitic structure and linear growth of the material is completed.

5. A method of handling formed members of thin material having inherent grain growth changes during low temperature heat treatment to prevent distortion of the material, comprising: lubricating the surfaces of the formed member; placing the formed member between confronting surfaces of thick, rigid block elements shaped to conform to the surface contours of the member; enclosing the assembly of formed member and block elements in a sealed, flexible, non-porous bag; evacuating the air from the interior of the bag causing the formed member to be clamped tightly between the block elements by external pressure and preventing contamination and surface finish damage to the material; and maintaining the vacuum while the temperature is lowered for the period of time required for treatment.

References Cited in the file of this patent

UNITED STATES PATENTS

| | | |
|---|---|---|
| 2,527,983 | Brown et al. | Oct. 31, 1950 |
| 2,713,196 | Brown | July 19, 1955 |